(12) United States Patent
John et al.

(10) Patent No.: US 8,364,817 B1
(45) Date of Patent: Jan. 29, 2013

(54) METHOD AND SYSTEM FOR MANAGING A DATA ITEM

(75) Inventors: Nitish John, Sunnyvale, CA (US);
Harriet H. John, Sunnyvale, CA (US);
Yu Yin Doo Kin, Monterey Park, CA (US)

(73) Assignee: Gramboo Inc., Sunnyvale, CA (US)

( * ) Notice: Subject to any disclaimer, the term of this patent is extended or adjusted under 35 U.S.C. 154(b) by 0 days.

(21) Appl. No.: 13/370,140

(22) Filed: Feb. 9, 2012

(51) Int. Cl.
*G06F 13/00* (2006.01)

(52) U.S. Cl. ........................................ 709/225; 709/214

(58) Field of Classification Search ................ 709/201, 709/202, 213, 214, 216, 223, 225
See application file for complete search history.

(56) References Cited

U.S. PATENT DOCUMENTS

| | | | |
|---|---|---|---|
| 2008/0209329 A1* | 8/2008 | DeFranco et al. | 715/733 |
| 2010/0299717 A1* | 11/2010 | Nasirifard et al. | 726/1 |
| 2010/0299758 A1* | 11/2010 | Hyun et al. | 726/28 |
| 2011/0197255 A1* | 8/2011 | Dicrescenzo et al. | 726/1 |
| 2012/0066084 A1* | 3/2012 | Sneyders | 705/26.1 |

* cited by examiner

*Primary Examiner* — Viet Vu
(74) *Attorney, Agent, or Firm* — Osha Liang LLP (57) ABSTRACT

A method for managing a data item includes a hub receiving a first access request from a first engine executing on a computing device operated by a first host and sending the first access request to a second engine executing on a first computing device of a second host. The second host owns the data item. The hub receives, from the second engine, the data item and an access rule set by the second host for the first host, and sends the first access rule and the data item to the first engine for storage. The first engine grants the first host access to the data item according to the first access rule.

19 Claims, 7 Drawing Sheets

METHOD AND SYSTEM FOR MANAGING A DATA ITEM

BACKGROUND

In today's interconnected world, sharing of information to update a person or a group is inevitable to maintain a family, social and/or professional relationship. The ubiquitous internet, whether in wired form or wireless form, allows for a faster data communication medium. Very often, and in most cases, information shared or exchanged is private—that is, the data is intended for a specific person or a group. Whether such information is private (for a targeted audience) or for public, the owner of the information often desires full control over the usage and dissemination of the information. It is quite common to use the widely available, so-called, "social" websites to share data. Such websites follow a subscription based model wherein the owner creates an account and must use the provided framework to post, update and maintain information on the hardware of the websites (or company). Also, information owners are bound to a single collection of information via the framework provided by these social websites, on their sites. Since the system is shared by many number of subscribers, information owners subscribed to the system are bound by the usage and privacy policies and terms and conditions imposed by the website.

SUMMARY

In general, in one aspect, the invention relates to a method for managing a data item. The method includes a hub receiving a first access request from a first engine executing on a computing device operated by a first host and sending the first access request to a second engine executing on a first computing device of a second host. The second host owns the data item. The hub receives, from the second engine, the data item and an access rule set by the second host for the first host, and sends the first access rule and the data item to the first engine for storage. The first engine grants the first host access to the data item according to the first access rule.

In general, in one aspect, the invention relates to a system for managing a data item. The system includes a first engine, a second engine, and a hub. The first engine executes on a computing device operated by a first host and includes a data item owned by the first host and an access rule corresponding to the data item. The second engine executes on a computing device operated by a second host and includes a repository for storing the data item after the data item is obtained from the first engine, and an enforcer module configured to grant the second host access to the data item according to the access rule for the data item. The hub includes a relay configured to relay a first access request for the data item from the second engine to the first engine, and relay the data item and the access rule from the first engine to the second engine.

In general, in one aspect, the invention relates to a method for managing a data item. The method includes a first engine executing on a computing device operated by a first host receiving a first access request for a data item from a hub. The first host owns the data item. The hub relays the first access request to the first engine from a second engine executing on a computing device operated by a second host. The first engine receives, in response to the first access request, an access rule corresponding to the second host from multiple access rules corresponding to a multiple hosts. The first engine sends the data item and the access rule for the data item to the second engine using the hub. The second engine grants the second host access to the data item in accordance with the access rule. The first engine receives a request to invoke ghosting mode from the first host. The method further includes generating, in response to the request to invoke ghosting mode, a state of the first engine that includes the data item and the multiple access rules to the hub. The hub establishes a proxy engine based on the state. The computing device operated by the first host is disconnected from the hub after the state is sent to the hub.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing one or more data items. Each data item is owned by a host (e.g., an individual, an employer, a merchant, etc.) and stored on a computing device operated by host. The computing devices of the multiple hosts are linked by one or more hubs. Hosts may share their data item(s) with other hosts while retaining ownership and control of the data items, including the control to delete an owned data item from another host's computing device. Further, a host may invoke a ghosting mode during which a hub is delegated to serve the data item according to one or more access rules, while the host's computing device is disconnected from the hub and/or the host is unavailable. Further still, a hub and a computing device may partake in data dissemination. In other words, some data items (e.g., data items the owner has designated as publicly accessible) can be delegated to the hub for hosting.

Figure 1:
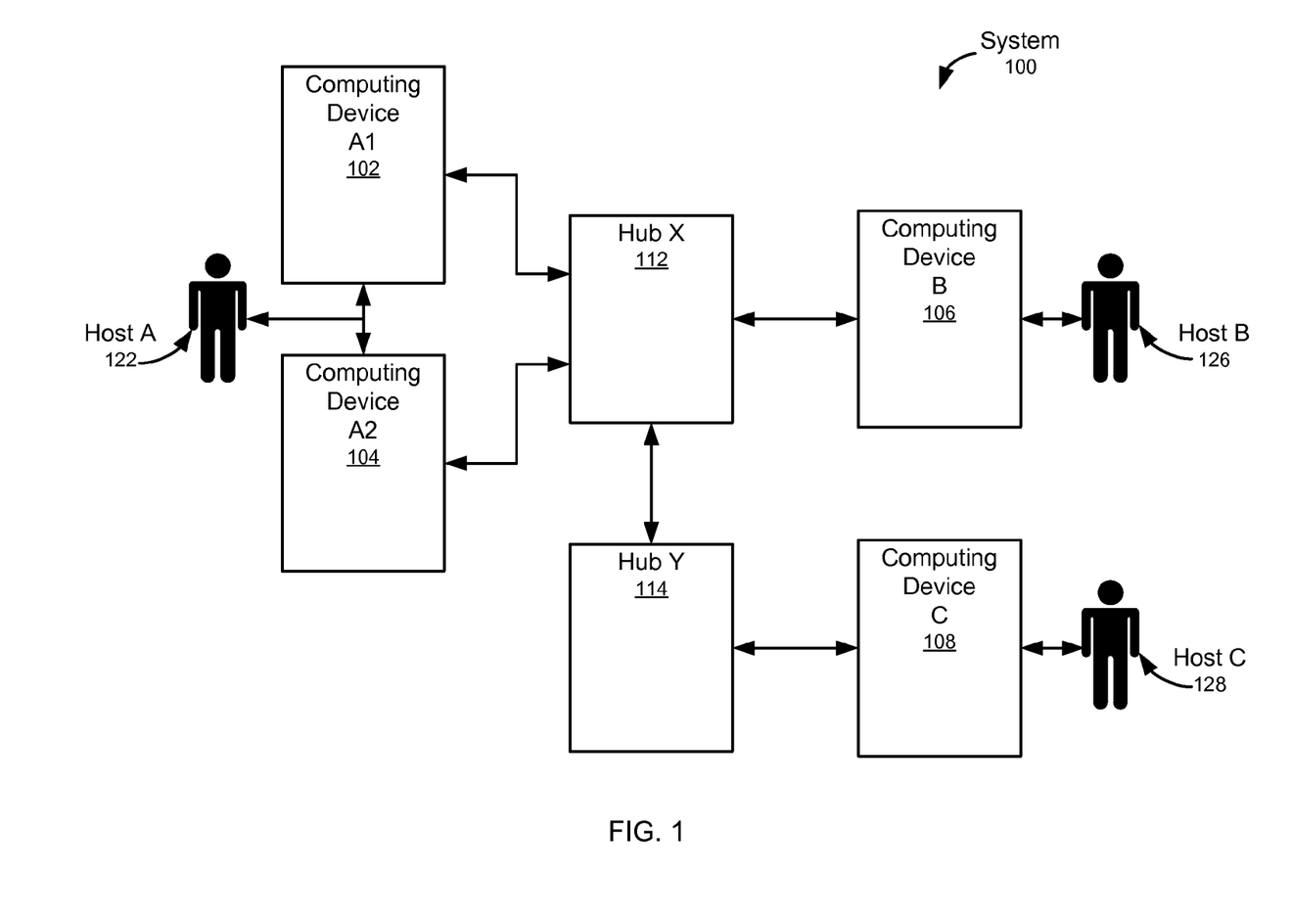
FIG. 1 shows a system in accordance with one or more embodiments of the invention.

FIG. 1 shows a system (100) in accordance with one or more embodiments of the invention. As shown in FIG. 1, the system (100) has multiple components including one or more computing devices (e.g., Computing Device A1 (102), Computing Device A2 (104), Computing Device B (106), Computing Device C (108)) operated by multiple hosts (e.g., Host A (122), Host B (126), Host C (128)). As shown in FIG. 1, each host (122, 126, 128) may operate a single computing device or multiple computing devices. For example, Host A (122) operates Computing Device A1 (102) and Computing Device A2 (104). As also shown in FIG. 1, Host B (126) operates Computing Device B (106), while Host C (128)

operates Computing Device C (108). Moreover, multiple hosts may operate a single computing device using separate profiles and login credentials. The hosts (122, 126, 128) may correspond to individuals, merchants, employers, families, special interest groups, non-profit organizations, academic institutions, government agencies/departments, etc.

Still referring to FIG. 1, the computing devices (102, 104, 106, 108) are connected to each other using one or more hubs (e.g., Hub X (112), Hub Y (114)). In other words, the hubs (112, 114) are used to relay data items, instructions, and/or requests between computing devices (102, 104, 106, 108). For example, Computing Device A1 (102) is operatively connected to Computing Device B (106) via Hub X (112). Thus, Hub X (112) is used to relay data items, instructions, and/or requests between Computing Device A1 (102) and Computing Device B (106). As yet another example, Computing Device C (108) is operatively connected to Computing Device A2 (104) via Hub Y (114) and Hub X (112). Thus, Hub X (112) and Hub Y (114) are used to relay/distribute data items, instructions, and/or requests between Computing Device C (108) and Computing Device A2 (104).

Each computing device (102, 104, 106, 108) and each hub (112, 114) may correspond to a server, a mainframe, a desktop personal computer (PC), a laptop computer, a personal digital assistant (PDA), a smart phone, a cable box, a tablet, an e-reader, a kiosk, etc. Further, the computing devices (102, 104, 106, 108) and the hubs (112, 114) may be connected using networks (e.g., the Internet, a wide area network (WAN), or a local area network (LAN), cellular network), with wired and/or wireless segments. Those skilled in the art, having the benefit of this detailed description, will appreciate that the system (100) may have any number of computing devices, and number of hosts, and any number of hubs.

Figure 2:
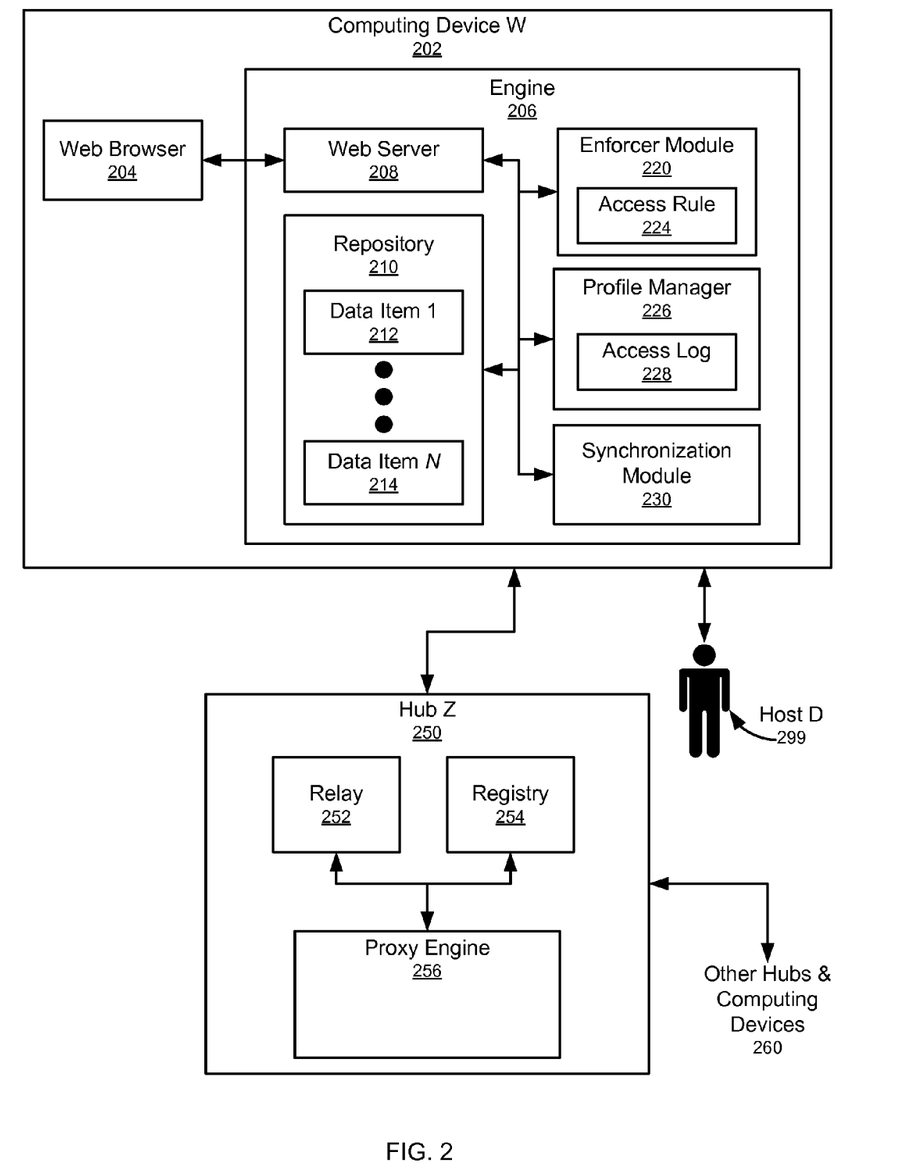
FIG. 2 shows a computing device and a hub of the system in accordance with one or more embodiments of the invention.

FIG. 2 shows Computing Device W (202), Host D (299), and Hub Z (250) in accordance with one or more embodiments of the invention. Computing Device W (202) is operated by Host D (299) and may correspond to any of the computing devices (102, 104, 106, 108) discussed above in reference to FIG. 1. As shown in FIG. 1, Computing Device W (202) may include a web browser (204) and an engine (206). Hub Z (250) may correspond to any of the hubs (112, 114) discussed above in reference to FIG. 1. As also shown in FIG. 1, Hub Z (250) includes a relay (252), a registry (254), and a proxy engine (256).

In one or more embodiments of the invention, the engine (206) includes a repository (210) storing one or more data items (e.g., Data Item 1 (212), Data Item N (214)). Each data item (212, 214) may correspond to a blog, an entry in a blog, a web page, a digital photograph, a document, a publication, an executable file, a spreadsheet, a slide show, a video clip, an audio clip, an advertisement, a notification, a coupon, a calendar, an email, etc. Further, the repository (210) may use any type of file system to organize the data items (212, 214) and/or the repository (210) may encrypt one or more of the data items (212, 214).

In one or more embodiments of the invention, one or more of the data items (e.g., Data Item 1 (212)) are owned by Host D (299) operating Computing Device W (202). Accordingly, Host D (299) may freely access, share, publish, and/or delete Data Item 1 (212). In one or more embodiments of the invention, one or more of the data items (e.g., Data Item N (214)) are owned by a host other than Host D (299) (i.e., a foreign host). In other words, Host D (299) may be a subscriber to the foreign host. Accordingly, Host D (299) may only access, share, publish, and/or delete Data Item N (214) according to the rules provided by the foreign host owning Data Item N (214) (discussed below). In one or more embodiments of the invention, the data items (212, 214) are identified and accessed using the concept of "my micro domain" (mmm), which parallels the ubiquitous "world wide web" (www).

In one or more embodiments of the invention, the engine (206) includes a profile manager (226). The profile manager (226) is configured to set up and store one or more "mmm" pages, including a landing "mmm" page, for Host D (299). The profile manager (226) may also be configured to set up and store one or more access rules set by Host D (299) with respect to data item(s) owned by Host D (299). Access rules may be set on a data item-by-data item basis and on a foreign host-by-foreign host basis. For example, Host D (299) may create an access rule that prohibits foreign host M (not shown) from sharing Data Item 1 (212). However, Host D (299) may also create another access rule that allows foreign host R (not shown) to share Data Item 1 (212). In one or more embodiments of the invention, the profile manager (226) is configured to identify/retrieve the access rule corresponding to both a selected data item owned by Host D (299) and a foreign host requesting access to the data item. A host may have multiple profiles, each might or might not be distinct. Similarly, a single computing device may have profiles for multiple hosts.

In one or more embodiments of the invention, the profile manager (226) stores/maintains an access log (228). The access log (228) includes one or more access entries corresponding to successful and unsuccessful requests from foreign hosts to access data items owned by Host D (299). In one or more embodiments of the invention, the profile manager (226) may send any changes/updates to the access rules to the relevant foreign hosts. For example, assume foreign host R (not shown) is initially given Data Item 1 (212) with an access rule that permits foreign host R (not shown) to freely share Data Item 1 (212). Then, for example, assume Host D (299) updates the access rule to prohibit foreign host R (not shown) from sharing Data Item 1 (212). The updated access rule may then be sent to foreign host R for enforcement.

In one or more embodiments of the invention, the engine (206) includes an enforcer module (220). The enforce module (220) is configured to enforce access rules (e.g., access rule (224)) set by foreign hosts for data items stored in the repository (210) but owned by the foreign hosts. For example, assuming Data Item N (214) is owned by a foreign host, the enforcer module (220) may prevent Host D (299) from sharing Data Item N (214). Similarly, the enforcer module (220) may delete Data Item N (214) from the repository (210) in response to a recall request from the foreign host owning Data Item N (214). The enforcer module (220) may also erase the entire repository (210) in response to an erasure instruction from another computing device (not shown) operated by Host D (299).

In one or more embodiments of the invention, the engine (206) includes a synchronization module (230). The synchronization module (230) is configured to generate/capture a state of the engine (206). The state may include both the latest access rules in the profile manager (226) and the data items owned by the Host D (299) and available to foreign hosts. The state may be captured in response to a request by the Host D (299) to invoke ghosting mode (discussed below). Ghosting mode may be invoked to establish the proxy engine (256) on Hub Z (250) before the Computing Device W (202) is disconnected from Hub Z (250) (discussed below).

In one or more embodiments of the invention, the synchronization module (230) is configured to execute data synchronization operations with Hub Z (250) (e.g., Proxy Engine (256)) after Computing Device W (202) is reconnected with Hub Z (250). Specifically, the synchronization module (230) is configured to receive/download access entries created by the proxy engine (256) and corresponding to access requests for data items owned by Host D (299) while Computing Device W (202) is disconnected from Hub Z (250). The access entries may subsequently be added to the access log (228). Moreover, the synchronization module (230) may also be configured to send updated access rules, updated data items, and requests generated by the engine (206) while Computing Device W (202) was disconnected from Hub Z (250).

In one or more embodiments of the invention, the synchronization module (230) is used for data dissemination. In such embodiments, the state generated by the synchronization module (230) includes the data items and corresponding access rule(s) that are to be hosted by Hub Z (250) (i.e., instead of Computing Device W (202)). Any data item may be selected by its owner for hosting by Hub Z (250). Moreover, the access rules for the data items being hosted by Hub Z (250) may be changed by the owner at any time.

In one or more embodiments of the invention, Computing Device W (202) includes a web server (208). The web server (208) may act as an interface between Host D (299), the engine (206), and the engines on computing devices operated by foreign hosts. Host D (299) uses the local web browser (204) to access the web server (208) and the "mmm" pages served by the web server (208). The "mmm" pages may include links to the data items (212, 214) and/or links to issue requests/instructions (e.g., access requests, erasure instructions, recall requests, etc.). Although FIG. 2 explicitly discloses a web server (208) for interfacing between Host D (299) and the engine (206), those skilled in the art, having the benefit of this detailed description, will appreciate that a custom application may be used as an alternative to the web server (208).

In one or more embodiments of the invention, Hub Z (250) has multiple components including a relay (252), a registry (254), and a proxy engine (256). As shown in FIG. 2, Hub Z (250) is operatively connected to Computing Device W (202) and to other hubs and computing devices (260).

In one or more embodiments of the invention, Hub Z (250) includes a registry (254). The registry (254) maintains a record of all computing devices, and thus hosts, currently connected to the system (100). The registry (254) may also maintain a record of the hub directly connected to each computing device. Accordingly, entries in the registry (254) may be added as computing devices/hubs are added to the system (100). Further, the registry (254) is configured to accept a target computing device and/or host as input, and output the identity of the hub and/or address of the hub (e.g., the internet protocol (IP) address) connected to the target computing device and/or host. The registry (254) may be implemented using any data structure, including a lookup table, a database, etc.

In one or more embodiments of the invention, the registry (254) records the subscribers (i.e., hosts) to a data item. Accordingly, when an update to the data item is published by the host that owns the data item, the update may be relayed to the subscribers.

As discussed above, data items (212, 214) may be identified and accessed using the concept of "my micro domain" (mmm), which parallels the ubiquitous "world wide web" (www). In one or more embodiments of the invention, the registry (254) maintains/records/tracks a micro-domain-name in the system (100).

In one or more embodiments of the invention, Hub Z (252) includes a relay (252). The relay (252) is configured to send and receive instructions, requests, and/or data items from engines and other hubs (206, 260). If Computing Device W (202) or Host D (299) is the target of an instruction, request, or data item, the relay (252) forwards the instruction, request, or data item to Computing Device W (202). In the event the target is a computing device not connected to Hub Z (250), the instruction, request, or data item is forwarded to the hub connected to the target computing device/host. The relay (252) may include buffers/queues for temporarily storing incoming/outgoing instructions, requests, and/or data items. Those skilled in the art, having the benefit of this detailed description, will appreciate that the relay (252) may access the registry (254) in order to perform one or more of its functions.

In one or more embodiments of the invention, Hub Z (250) includes a proxy engine (256). The proxy engine (256) is a quasi-mirror of engine (206). Specifically, the proxy engine (256) is established by Hub Z (250) based on a captured state of engine (206) (e.g., access rules set by Host D (299), data items owned by Host D (299)). In one or more embodiment of the invention, the proxy engine (256) is established/activated in response to a request by Host D (299) to invoke ghosting. In ghosting mode, the proxy engine (256) exercises and serves diligently and in good faith the permissions (i.e., access rights/rules) and data items delegated by Host D (299). Further, in ghosting mode, the proxy engine (256) is the decision maker for Host D (299) and Computing Device W (202) need not be connected to Hub Z (250).

In one or more embodiments of the invention, the proxy engine (256) maintains detailed logs of all access requests for the data items provided in the state. Specifically, the proxy engine (256) may generate access entries identifying the host(s)/computing device(s) requesting access to one or more of the data items provided in the state, and the data items and access rules, if any, sent to the requesting host(s)/computing device(s). The proxy engine (256) may also store some instructions/requests (e.g., erasure instructions, recall requests) destined for the engine (206). Moreover, the generated access entries and the stored instructions/requests may be sent to the engine (206) when Computing Device W (202) is subsequently reconnected to Hub Z (250) and a data synchronization operation between the engine (206) and the proxy engine (256) is executed.

Figure 3:
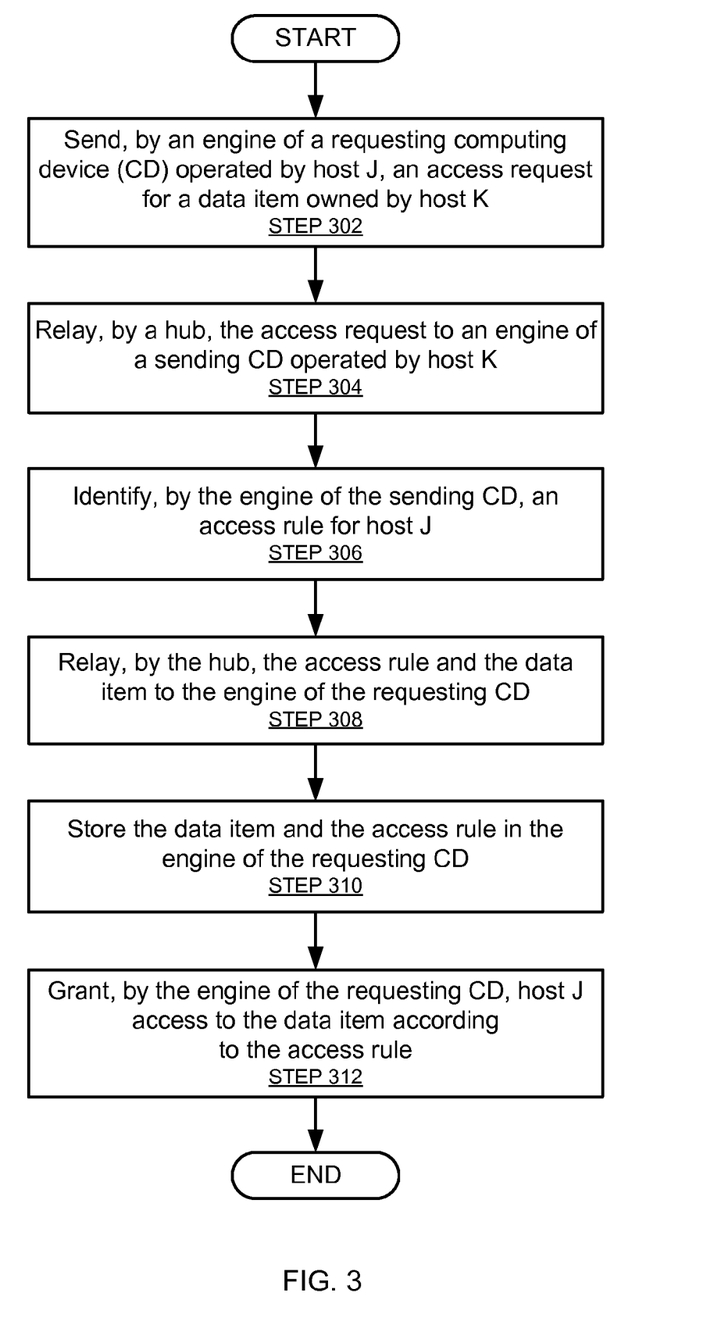
FIGS. 3, 4A, 4B, and 5 show flowcharts in accordance with one or more embodiments of the invention.

FIG. 3 shows a flowchart in accordance with one or more embodiments of the invention. The process shown in FIG. 3 may be used, for example, with the components of system (100) (e.g., Computing Device A1 (102), Computing Device B (106), Hub X (112), discussed above in reference to FIG. 1 and FIG. 2) to manage a data item. One or more steps shown in FIG. 3 may be omitted, repeated, and/or performed in a different order among different embodiments of the invention. Accordingly, embodiments of the invention should not be considered limited to the specific number and arrangement of steps shown in FIG. 3.

Initially, an access request for a data item is sent by an engine executing on a requesting computing device operated by host J (STEP 302). As the data item is owned by host K, the access request identifies host K. The access request may be referred to as a subscription request. The data item may correspond to a blog, an entry in a blog, a web page, a digital photograph, a document, a publication, an executable file, a spreadsheet, a slide show, a video clip, an audio clip, a coupon, an advertisement, a notification, a calendar, an email, etc. Further, the access request may take the form of a packet having a header and payload, a text message, an instant message, a universal resource locator (URL), etc. In one or more embodiments of the invention, the access request may be issued by selecting a link on a "mmm" page.

In STEP 304, the access request is received by a hub connected to the requesting computing device and relayed to a sending computing device operated by host K (i.e., the owner of the data item). The access request may be relayed to all computing devices operated by host K. In one or more embodiments of the invention, the hub accesses a register to lookup the address (e.g., IP address) of the sending computing device operated by host K.

In STEP 306, the access request is received by an engine executing on the sending computing device and an access rule for host J is identified. As discussed above, host K owns the data item. Accordingly, host K may set one or more access rules for host J (e.g., using Profile Manager (226), discussed above in reference to FIG. 2) to control how host J is able to use/access the data item. For example, host B may set an access rule that prevents host J from sharing the data item with other hosts. In one or more embodiments of the invention, an access log in the engine executing on the sending computing device is updated to reflect the access request.

In STEP 308, a reply to the access request including the data item and the access rule is sent to the hub, and the hub relays the reply to the requesting computing device. In STEP 310, the data item and the access rule are received and stored in the engine executing on the requesting computer device. Specifically, the data item may be stored in a repository (e.g., Repository (210), discussed above in reference to FIG. 2) of the engine, while the access rule may be store in an enforcer module (e.g., Enforcer Module (220), discussed above in reference to FIG. 2) of the engine.

In STEP 312, the engine executing on the requesting computing device grants host J access to the data item according to the access rule. In one or more embodiments of the invention, the engine includes a web server, and the computing device includes a browser operated by host J to access the data item. As discussed above, the access rule may prevent host J from sharing the data item with other hosts. Host J may now access the data item even when the requesting computing device and/or the sending computing device are offline (i.e., disconnected from the hub).

Those skilled in the art, having the benefit of this detailed description, will appreciate that following STEP 312, a computing device may send (i.e., publish) an update to the data item (e.g., a new blog entry, reader comments regarding a blog, a new version of a document, etc.) to the hub. The hub may relay the update to the data item to the computing devices of all hosts (i.e., subscribers) that previously requested the data item.

Figure 4A:
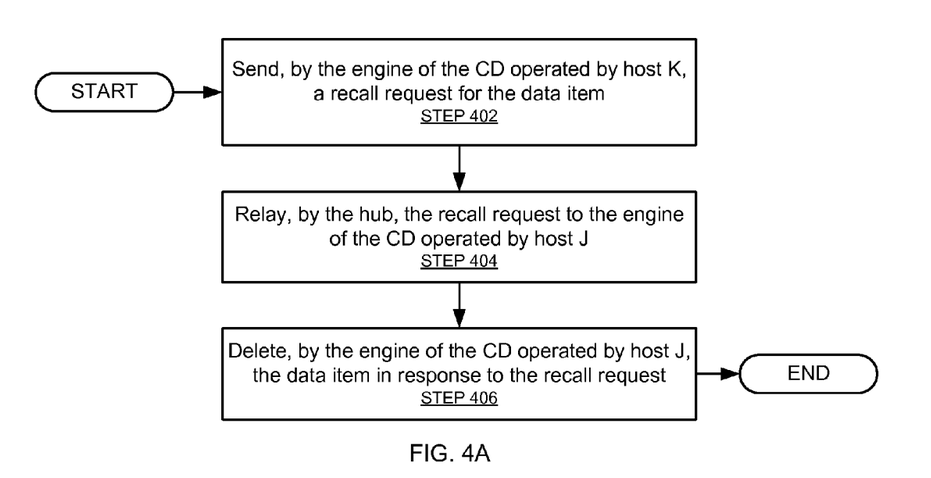

FIG. 4A shows a flowchart in accordance with one or more embodiments of the invention. The process shown in FIG. 4A may be used, for example, with the components of system (100) (e.g., Computing Device A1 (102), Computing Device B (106), Hub X (112), discussed above in reference to FIG. 1 and FIG. 2) to manage a data item. Moreover, one or more steps in FIG. 4A may be executed before or after any step in FIG. 3 (e.g., after STEP 312). One or more steps shown in FIG. 4A may be omitted, repeated, and/or performed in a different order among different embodiments of the invention. Accordingly, embodiments of the invention should not be considered limited to the specific number and arrangement of steps shown in FIG. 4A.

Initially, a recall request for the data item is sent by the engine executing on the computing device operated by host K (STEP 402). Host K is able to issue a recall request for the data item because host K is the owner of the data item. The recall request may be directed towards only one host (e.g., host J). Alternatively, the recall request may be directed towards all hosts or a group of hosts that previously requested the data item, as identified in the access log (e.g., Access Log (228), discussed above in reference to FIG. 2) of the engine.

Further, the recall request may take the form of a packet having a header and payload, a text message, an instant message, a universal resource locator (URL), etc. In one or more embodiments of the invention, the recall request may be issued by selecting a link on a "mmm" page.

In STEP 404, the recall request is received by a hub connected to the computing device operated by host K and relayed to the computing device operated by host J. Alternatively, the hub may relay the request to the computing devices of all hosts that previously requested the data item. In one or more embodiments of the invention, the hub accesses a register to lookup the address (e.g., IP address) of the computing device operated by host J.

In STEP 406, the recall request is received by the engine executing on the computing device operated by host J, and the data item is deleted by the engine in response to the recall request. Specifically, the data item may be deleted from a repository (e.g., Repository (210), discussed above in reference to FIG. 2) of the engine, by an enforcer module (e.g., Enforcer Module (220), discussed above in reference to FIG. 2) of the engine. Those skilled in the art, having the benefit of this detailed description, will appreciate that the recall request is one example of how the host owning the data item maintains control of the data item, even when the data item is stored on a computing device operated by another host.

Figure 4B:
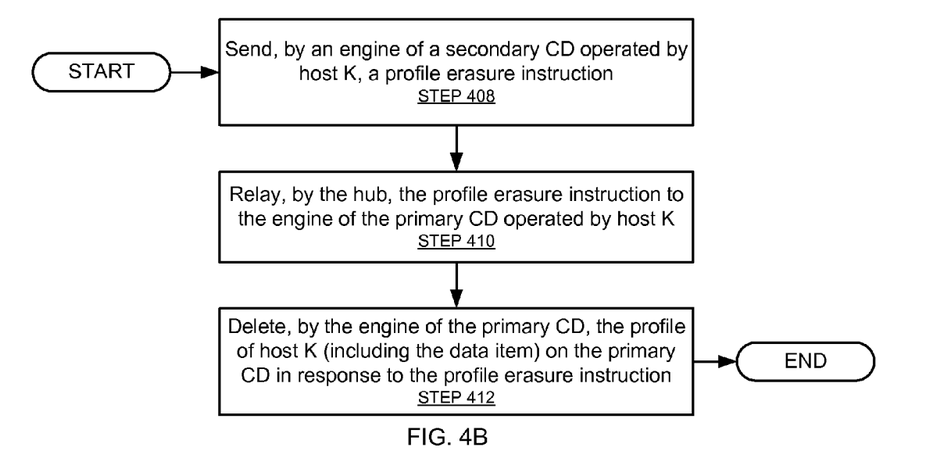

FIG. 4B shows a flowchart in accordance with one or more embodiments of the invention. The process shown in FIG. 4B may be used, for example, with the components of system (100) (e.g., Computing Device A1 (102), Computing Device B (106), Hub X (112), discussed above in reference to FIG. 1 and FIG. 2) to manage a data item. Moreover, one or more steps in FIG. 4B may be executed before or after any step in FIG. 3 (e.g., after STEP 312) or 4A. One or more steps shown in FIG. 4B may be omitted, repeated, and/or performed in a different order among different embodiments of the invention. Accordingly, embodiments of the invention should not be considered limited to the specific number and arrangement of steps shown in FIG. 4B.

Initially, a profile erasure instruction is sent by an engine executing on a secondary computing device (i.e., a computing device other than the sending computing device, discussed above in reference to FIG. 3) operated by host K. The profile erasure request may take the form of a packet having a header and payload, a text message, an instant message, a universal resource locator (URL), etc. In one or more embodiments of the invention, the profile erasure request may be issued by selecting a link on a "mmm" page.

In STEP 410, the profile erasure instruction is received by the hub connected to the secondary computing device operated by host K and relayed to the primary computing device (e.g., the sending computing device, discussed above in reference to FIG. 3) owned by host K. In one or more embodiments of the invention, the hub accesses a register to lookup the address (e.g., IP address) of the primary computing device owned by host K.

In STEP 412, the profile erasure instruction is received by the primary computing device owned by host K, and the engine executing on the primary computing device erases a profile of host K (including the data item) on the primary computing device. In one or more embodiments of the invention, the enforcer module (i.e., Enforcer Module (220), discussed above in reference to FIG. 2) executes the erasure in response to profile erasure instruction.

Those skilled in the art, having the benefit of this detailed description, will appreciate that the process in FIG. 4B may be executed when the primary computing device of host K is stolen or misplaced, in order to prevent unauthorized persons from accessing the contents in the repository of the engine executing on the stolen/misplaced primary computing device.

Figure 5:
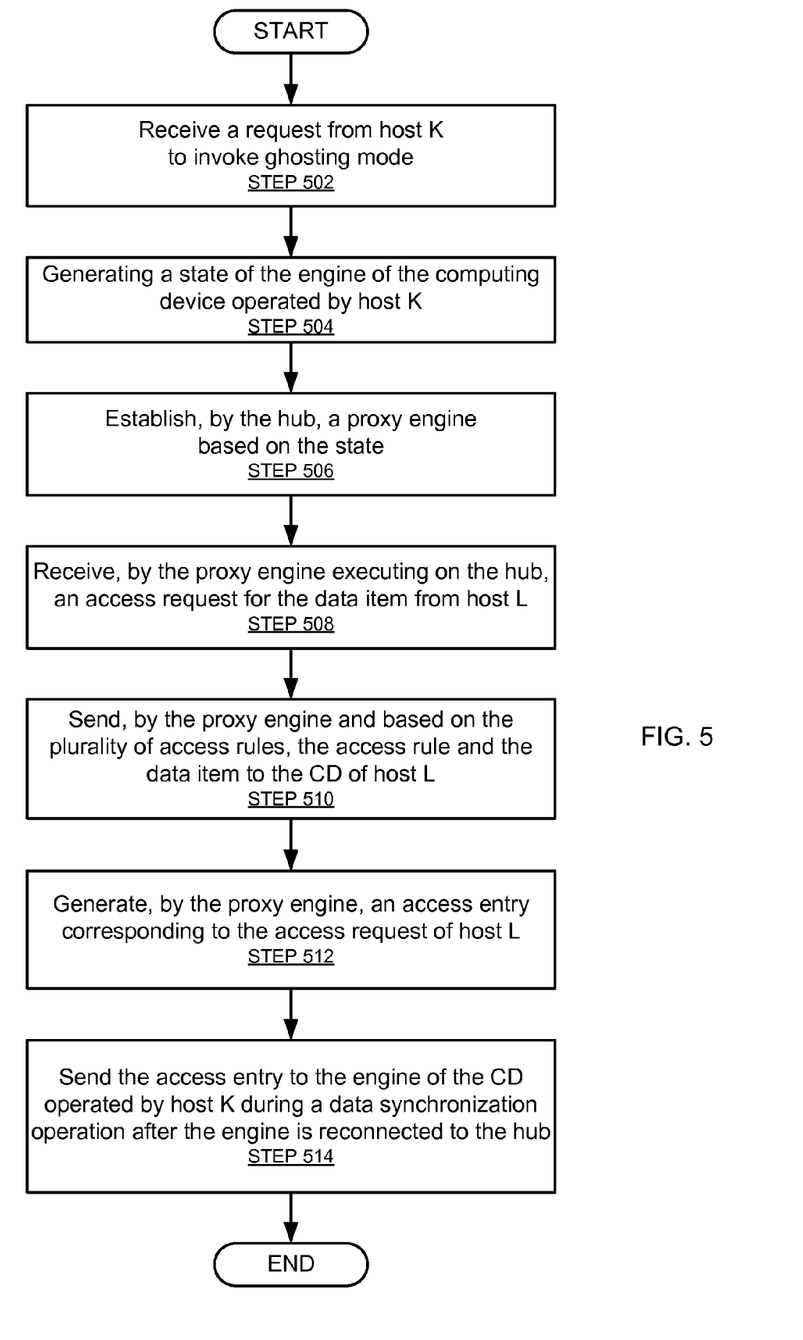

FIG. 5 shows a flowchart in accordance with one or more embodiments of the invention. The process shown in FIG. 5 may be used, for example, with the components of system (100) (e.g., Computing Device A1 (102), Computing Device B (106), Hub X (112), discussed above in reference to FIG. 1 and FIG. 2) to manage a data item. Moreover, one or more steps in FIG. 5 may be executed before or after any step in FIG. 3 (e.g., after STEP 312). One or more steps shown in FIG. 5 may be omitted, repeated, and/or performed in a different order among different embodiments of the invention. Accordingly, embodiments of the invention should not be considered limited to the specific number and arrangement of steps shown in FIG. 5.

Initially, a request is received from host K to invoke ghosting mode (STEP 502). The request may be received by the engine executing on the computing device operated by host K. Further, the request is an indication the computing device operated by host K will be disconnected from the system (100). In one or more embodiments of the invention, the request to invoke ghosting mode may be issued by selecting a link on a "mmm" page.

In STEP 504, a state of the engine executing on the computing device operated by host K is generated/captured. As discussed above, the state is a snap-shot of the engine at the time the request to invoke ghosting mode was received. As also discussed above, the state includes the access rules set by host K and the data items made available by host K. In one or more embodiments of the invention, the state is captured/generated by a synchronization module (i.e., synchronization module (230), discussed above in reference to FIG. 2). The state may be sent to the hub connected to the computing device operated by host K.

In STEP 506, the hub receives the state and the hub establishes a proxy engine based on the state. As discussed above, the proxy engine is a quasi-mirror of the engine executing on the computing device operated by host K. In ghosting mode, the proxy engine exercises and serves diligently and in good faith the permissions (i.e., access rights/rules) and data items delegated by host K. Further, in ghosting mode, the proxy engine is the decision maker for host K and the computing device operated by host K may be disconnected from the system (100).

In STEP 508, a request to access the data item is received by the hub in ghosting mode. Specifically, the request is sent by an engine executing on a computing device of host L. Further, the access request may take the form of a packet having a header and payload, a text message, an instant message, a universal resource locator (URL), etc. In one or more embodiments of the invention, the access request may be issued by host L selecting a link on a "mmm" page. In normal mode, the access request would be relayed by the hub to the computing device operated by host K. However, as ghosting mode has been invoked and the computing device operated by host K has been disconnected from the hub, the access request is being handled by the proxy engine on the hub.

In STEP 510, an access rule for host L is identified by the proxy engine. As discussed above, host K owns the data item. Accordingly, host K may set one or more access rules for host L. Moreover, the one or more access rules for host L were included in the state used to establish the proxy engine. The access rule for host L and the data item are sent to the computing device operated by host L. In STEP 512, the proxy engine generates an access entry corresponding to the access request from host L.

In STEP 514, the computing device operated by host K is reconnected to hub and a data synchronization operation is executed between the proxy engine and the engine executing on the computing device operated by host K. During the data synchronization operation, the access entry corresponding to the access request from host L is sent by the proxy engine to the computing device. The engine executing on the computing device may update its access log (e.g., Access Log (228), discussed above in reference to FIG. 2) with the access entry.

Figure 6:
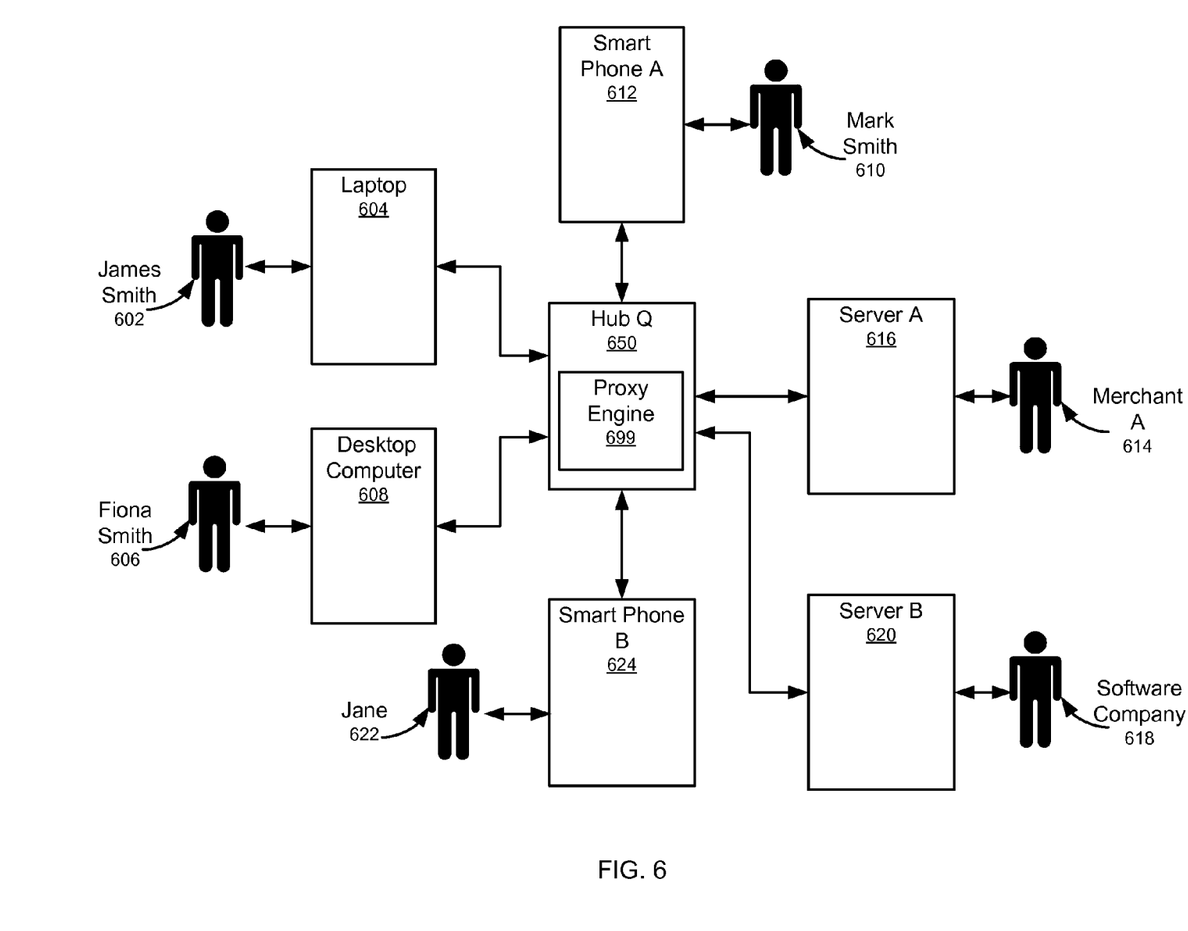
FIG. 6 shows an example in accordance with one or more embodiments of the invention.

FIG. 6 shows an example in accordance with one or more embodiments of the invention. As shown in FIG. 6, there exists multiple hosts (i.e., James Smith (602), Fiona Smith (606), Mark Smith (610), Merchant (614), Software Company (618), and Jane (622)) each operating a computing device (i.e., Laptop (604), Desktop Computer (608), Smart Phone (612), Server A (616), Server B (620), Smart Phone B (624)). All the computing devices (604, 608, 612, 616, 620, 624) are operatively connected by Hub Q (650).

James Smith (602) is a reporter working on his news reports (i.e., data item). When James Smith (602) publishes his report, the engine executing on the laptop (604), if connected to the internet, publishes the updates to all subscribed HOSTS (e.g., Jane (622)). Specifically, Hub Q (650) receives a copy of the news report. Based on the access rule(s) set for this content by James Smith (602), the report is pulled by all subscribers that are connected to Hub Q (650). Jane (622) receives and stores a copy on Smart Phone B (624) based on policies (i.e., access rules) set by James Smith (602). If James Smith (602) has the comments/feedback feature turned on for every report, then every subscriber is capable of writing comments/feedback for reports they get. Such data, when published, reaches Hub Q (650) and is then forwarded to James Smith (602). Such data, once recorded by the laptop (604), is again relayed to all subscribers, by sending it to Hub Q (650) and thereafter dispersing to subscribers.

Fiona Smith (606) and Jane (622) are friends. Jane (622) just got back from her vacation in Hawaii. She just finished uploading all the photos (i.e., data items) from her trip on her camera to her computer. Jane (622) picks a few of the photographs to share as an album with Fiona Smith (606). Jane (622) publishes her album. Based on the access rules set by Jane (622), a copy of the album is sent to Hub Q (650) and thereafter forwarded to the desktop computer (608) operated by Fiona Smith (606). Fiona Smith (606) now has her copy of the album on the desktop computer (608). She is not affected by the connectivity of the internet in order to view the album. If the access rules on this album are such that Jane (622) has only allowed a read-only version of the album, then Jane can decide to remotely remove (i.e., recall request) this album from anyone's computing device with whom she has shared it.

Fiona Smith (606) has also subscribed to notifications published by the merchant (614). Every time the merchant (614) announces deals or uploads brochures or coupons, a copy of this data is sent to Hub Q (650) and thereafter forwarded to all subscribers, including Fiona Smith (606). The subscribers now have a local copy of these coupons. Similarly, Mark Smith (610) is a software engineer. He has subscribed to the notifications published by the software company (6189).

Now assume James Smith (602) will be working in the field where there is little to no Internet connectivity. Prior to disconnecting the laptop (604), James Smith (602) invokes the ghosting mode, whereby, he sends a captured state of his data and engine executing on the laptop (604) to the Hub Q (650). Hub Q (650) establishes a proxy engine (699) to serve requests for his data based upon the access rules set up by James Smith (602).

Embodiments of the invention may include one or more of the following advantages: the ability of a host to maintain true ownership of a data item; the ability of a host to recall a data item sent to a foreign host; the ability of a local host to access a data item owned by a foreign host even when the foreign host and/or the local host are offline (i.e., not connected to the hub); the ability to maintain multiple copies of the data item on multiple computing devices owned/operated by the host; the ability to invoke ghosting mode and delegate selected rights of a host to a hub; the ability to maintain multiple copies of data items on multiple computing devices owned by a host (i.e., if one of the computing devices breaks down or corrupts data then the data can be relocated by fetching last known data states from peer computing devices and hubs), etc.

Figure 7:
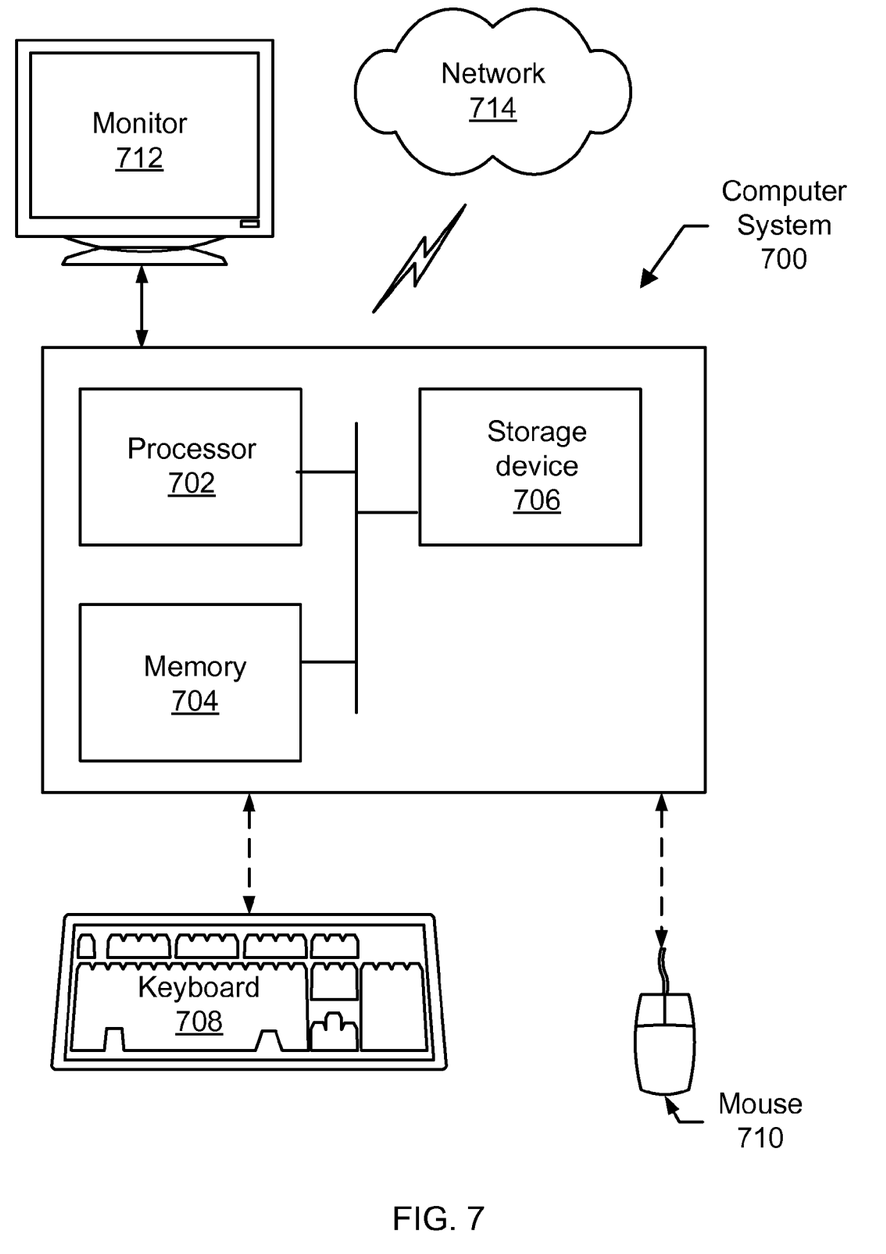
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702), an associated memory (704) (e.g. random access memory (RAM), cache memory, flash memory, etc.), a storage device (706) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (702) is hardware. For example, the processor may be an integrated circuit. The computer system (700) may also include input means, such as a keyboard (708), a mouse (710), or a microphone (not shown). Further, the computer system (700) may include output means, such as a monitor (712) (e.g. a liquid crystal display (LCD), a plasma display, or cathode ray tube (CRT) monitor). The computer system (700) may be connected to a network (714) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (700) includes at least the minimal processing, input, and/or output means necessary to practice embodiments of the invention.

Further, in one or more embodiments of the invention, one or more elements of the aforementioned computer system (700) may be located at a remote location and connected to the other elements over a network. Further, embodiments of the invention may be implemented on a distributed system having a plurality of nodes, where each portion of the invention (e.g. the hardware device, the image processing device, the computing device) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a data item, comprising:
receiving, by a hub, a first access request from a first engine executing on a computing device operated by a first host;
sending, by the hub, the first access request to a second engine executing on a first computing device of a second host, wherein the second host owns the data item;
receiving, by the hub and from the second engine, the data item and an access rule set by the second host for the first host;
sending, by the hub, the first access rule and the data item to the first engine for storage,
wherein the first engine grants the first host access to the data item according to the first access rule;
receiving, by the hub, a state of the first engine;
establishing, within the hub, a proxy engine for the first engine based on the state of the first engine;
receiving, by the hub, a recall request from the second engine for the data item,
wherein the computing device operated by the first host is disconnected from the hub before the recall request is received;
storing, by the hub, the recall request in the proxy engine,
wherein the computing device operated by the first host is reconnected to the hub after the recall request is stored; and
sending, by the hub, the recall request to the first engine during a data synchronization operation between the proxy engine and the first engine,
wherein the first engine deletes the data item stored on the computing device operated by the first host in response to the recall request.

2. The method of claim 1, wherein the first access rule prevents the first host from sending the data item to a third engine executing on a computing device of a third host.

3. The method of claim 1, further comprising:
receiving, by the hub, a profile erasure instruction from a second computing device operated by the second host; and
sending, by the hub, the profile erasure instruction to the second engine,
wherein the second engine erases a profile of the second host on the first computing device in response to the profile erasure instruction.

4. The method of claim 1, further comprising:
receiving, by the hub, an update to the data item owned by the second host; and
sending, by the hub and in response to sending the data item to the first engine, the update to the first engine.

5. The method of claim 4, wherein the hub receives the update from a second computing device operated by the second host.

6. The method of claim 1, wherein the first engine comprises a web server, wherein the computing device operated by the first host comprises a web browser, and wherein the first host accesses the data item using the web browser connected to the web server.

7. A system for managing a data item, comprising:
a first engine executing on a computing device operated by a first host and comprising:
a data item owned by the first host and an access rule corresponding to the data item;
a profile manager storing a plurality of identities of a plurality of hosts and a plurality of access rules corresponding to the plurality of hosts; and a synchronization module configured to generate a state of the first engine comprising the data item and the plurality of access rules;

a second engine executing on a computing device operated by a second host and comprising:

a repository for storing the data item after the data item is obtained from the first engine; and an enforcer module configured to grant the second host access to the data item according to the access rule for the data item; and a hub comprising a relay configured to:

relay a first access request for the data item from the second engine to the first engine;

relay the data item and the access rule from the first engine to the second engine, wherein the computing device operated by the first host is disconnected from the hub after the state is sent to the hub; and execute a data synchronization operation with the synchronization module after the computing device operated by the first host is reconnected to the hub.

8. The system of claim 7, wherein the second engine further comprises a web server, wherein the computing device operated by the second host comprises a web browser, and wherein the second host accesses the data item using the web browser operatively connected to the web server.

9. The system of claim 7, wherein the hub further comprises:

a proxy engine established by the hub based on the state received from the first engine and configured to:

receive a second access request associated with a third engine executing on a computing device operated by a third host;

send, based on the plurality of access rules, the data item and the access rule to the third engine;

store an access entry corresponding to the second access request; and send the access entry corresponding to the second access request to the first engine during the data synchronization operation.

10. The system of claim 7, wherein the first engine is further configured to issue a recall request for the data item, and wherein the enforcer module is further configured to delete the data item from the computing device operated by the second host in response to the recall request.

11. The system of claim 7, wherein the first engine comprises a web server configured to serve a web page comprising a link to the data item, and wherein the first access request corresponds to a selection of the link by the second host.

12. The system of claim 7, wherein the data item is at least one selected from a group consisting of a digital photograph, a blog, a blog entry, a slide show, an electronic document, and a calendar.

13. A method for managing a data item, comprising:

receiving, by a hub, a first access request from a first engine executing on a computing device operated by a first host;

sending, by the hub, the first access request to a second engine executing on a first computing device of a second host, wherein the second host owns the data item;

receiving, by the hub and from the second engine, the data item and an access rule set by the second host for the first host;

sending, by the hub, the first access rule and the data item to the first engine for storage, wherein the first engine grants the first host access to the data item according to the first access rule;

receiving, by the hub, a state of the second engine comprising the data item and a plurality of access rule corresponding to a plurality of hosts;

establishing, within the hub, a proxy engine for the second engine based on the state of the second engine;

receiving, by the hub and from a third engine executing on a computing device operated by a third host, a second access request for the data item, wherein the second access request is received after the first computing device operated by the second host is disconnected from the hub;

sending, by the proxy engine and based on the plurality of access rights, the data item and the access rule to the third engine, wherein the third engine grants the third host access to the data item according to the access rule; and sending, by the hub and after the first computing device operated by the second host is reconnected to the hub, an access entry corresponding to the second access request to the second engine during a data synchronization operation between the proxy engine and the second engine.

14. The method of claim 13, further comprising:

receiving, by the hub, a recall request from the second engine for the data item; and sending, by the hub, the recall request to the first engine, wherein the first engine deletes the data item stored on the computing device operated by the first host in response to the recall request.

15. The method of claim 14, further comprising:

sending, by the hub, the recall request to the third engine, wherein the third engine is executing on a computing device operated by the third host, and wherein the third engine deletes the data item stored on the computing device operated by the third host in response to the recall request.

16. The method of claim 13, further comprising:

receiving, by the hub, a profile erasure instruction from a second computing device operated by the second host; and sending, by the hub, the profile erasure instruction to the second engine, wherein the second engine erases a profile of the second host on the first computing device in response to the profile erasure instruction.

17. The method of claim 13, further comprising:

receiving, by the hub, an update to the data item owned by the second host; and sending, by the hub and in response to sending the data item to the first engine, the update to the first engine.

18. The method of claim 17, wherein the hub receives the update from a second computing device operated by the second host.

19. The method of claim 13, wherein the first engine comprises a web server, wherein the computing device operated by the first host comprises a web browser, and wherein the first host accesses the data item using the web browser connected to the web server.

* * * * *